United States Patent [19]

Umetsu et al.

[11] Patent Number: 4,516,788
[45] Date of Patent: May 14, 1985

[54] SEATING POSITION ADJUSTING DEVICE FOR AN AUTOMOTIVE VEHICLE SEAT

[75] Inventors: Yoshihiro Umetsu, Zama; Masakazu Muraishi, Isehara; Osamu Ito, Ebina; Masakatsu Kakeba, Tanashi, all of Japan

[73] Assignee: Nissan Motor Company, Limited, Yokohama, Japan

[21] Appl. No.: 532,030

[22] PCT Filed: Dec. 24, 1982

[86] PCT No.: PCT/JP82/00477
§ 371 Date: Aug. 12, 1983
§ 102(e) Date: Aug. 12, 1983

[87] PCT Pub. No.: WO83/02219
PCT Pub. Date: Jul. 7, 1983

[30] Foreign Application Priority Data

Dec. 29, 1981 [JP] Japan .................. 56-211640

[51] Int. Cl.³ ............... A47C 7/46; B60N 1/06; B60G 17/00
[52] U.S. Cl. ................... 280/6 R; 180/41; 280/711; 297/284
[58] Field of Search ......... 280/6 R, 711; 297/284, 297/1, 4, 56, DIG. 3; 180/41

[56] References Cited

U.S. PATENT DOCUMENTS

| | | | |
|---|---|---|---|
| 3,330,598 | 7/1967 | Whiteside | 297/284 |
| 3,510,143 | 5/1970 | Carpenter | 280/6 R |
| 4,139,235 | 2/1979 | Elbert | 297/284 |
| 4,293,139 | 10/1981 | Brown | 280/6 R |
| 4,327,936 | 5/1982 | Sekiguchi | 280/711 |
| 4,349,077 | 9/1982 | Sekiguchi et al. | 180/41 |
| 4,444,430 | 4/1984 | Yoshida et al. | 297/DIG. 3 |

FOREIGN PATENT DOCUMENTS

| | | |
|---|---|---|
| 0058951 | 9/1982 | European Pat. Off. . |
| 3138079 | 5/1982 | Fed. Rep. of Germany . |
| 4711021 | 3/1946 | Japan . |
| 2061840 | 5/1979 | United Kingdom . |

*Primary Examiner*—Richard A. Bertsch
*Attorney, Agent, or Firm*—Schwartz, Jeffery, Schwaab, Mack, Blumenthal & Koch

[57] ABSTRACT

Device for adjusting seating position of an automotive vehicle seat by using the change of the pressure of a working gas is so designed that the working gas is propelled using a pressure pump of a pneumatic vehicle-height-adjusting device without an additional pump used exclusively for pressurizing the working gas. Therefore, the working portion of the seating position adjusting device is connected to a working gas passage of the vehicle height adjusting device via a working gas supply passage. The working gas supply passage is provided with a control valve so that introduction of the working gas is controlled. The working portion is further provided with an exhaust valve so as to control the exhaust operation of the working gas from the working portion.

10 Claims, 3 Drawing Figures

SEATING POSITION ADJUSTING DEVICE FOR AN AUTOMOTIVE VEHICLE SEAT

FIELD OF THE INVENTION

The present invention relates to a seat, specifically, a seating position adjusting device for an automotive vehicle seat. More particularly, the present invention relates to a device for adjusting a lumbar support, a thigh support, a side support or the like installed in an automotive vehicle seat by adjusting the pressure of a working gas.

BACKGROUND OF THE INVENTION

Conventionally, it has been attempted or proposed that an adjustable lumbar support, thigh support, side support or the like be installed in a automotive vehicle seat, particularly driver's seat, to adjust seating position of the seat. In U.S. Pat. No. 3,330,598 issued on July 11, 1967, to George Harold Whiteside, there is shown a seat whose seat cushion and seat back are composed of a plurality of pneumatic chambers and each pneumatic chamber is connected to a pressurized gas supply source through a pressure control means. Further, Japanese Patent Application for Utility Model Publication No. Sho. 47-11021, published on Oct. 9, 1971 shows a seat for automotive vehicle equipped with a pneumatic lumbar support for which the tension of the portion thereof in contact with the lumbar region of the seated passenger is adjusted by adjusting the pressure of working gas in the pneumatic chamber.

In the above seat, a pneumatic pump is used as a pressure gas supply source, and this pump is installed in the vehicle compartment. Accordingly, such conventional devices may cause problems in that the vehicle body weight will be increased owing to this pneumatic pump and in addition, the manufacturing cost will also be increased. Additionally, since the pneumatic pump is ordinarily arranged in the vehicle compartment, space for mounting the pump is required. Furthermore, working noise is generated in the compartment since the pump is arranged in the compartment, thereby disturbing the quietness of the compartment.

Therefore, it is the primary object of the present invention to provide an adjusting device for a seat which has improved operational capabilities without a dedicated pneumatic pump, and can work without degrading the quietness of the vehicle compartment.

SUMMARY OF THE INVENTION

To accomplish the above or the other objects of the present invention, a seating position adjusting device for an automotive vehicle seat according to the present invention is so designed that the pressure in a pneumatic chamber of the adjusting device is adjusted by means of a compressor or a pressure pump used in a vehicle height adjusting system which adjusts the vehicle height automatically by means of a working gas. A pneumatic chamber formed in a seat equipped with the seating position adjusting device is therefore connected to a working gas passsage of the vehicle height adjusting system through a control valve. The control valve is electrically connected to a driving switch which is disposed in the seat or the vicinity thereof. Thus, the valve is opened in accordance with a driving signal from the driving switch so that the pressurized gas from the compressor or pressure pump is introduced into the pneumatic chamber. The pneumatic chamber itself is provided with a relief valve for preventing excessive increase of the pressure in the pneumatic chamber by releasing some pressure through the relief valve when the pressure in the pneumatic chamber coincides with a predetermined value. This relief valve prevents the pressure in the pneumatic chamber from increasing beyond a predetermined value, thereby preventing the pneumatic chamber from breaking. Furthermore, the pneumatic chamber is provided with an exhaust valve to exhaust the pressurized gas in the pneumatic chamber to the ambient air so that the pressure in the pneumatic chamber can be adjustably decreased.

BRIEF DESCRIPTION OF THE DRAWINGS

The present invention will be understood more fully from the detailed description given herebelow and from the accompanying drawings of the preferred embodiment of the present invention, which however, should not be taken as limitative to the invention but for elucidation and explanation only.

In the drawings.

DESCRIPTION OF THE PREFERRED EMBODIMENT

Figure 1:
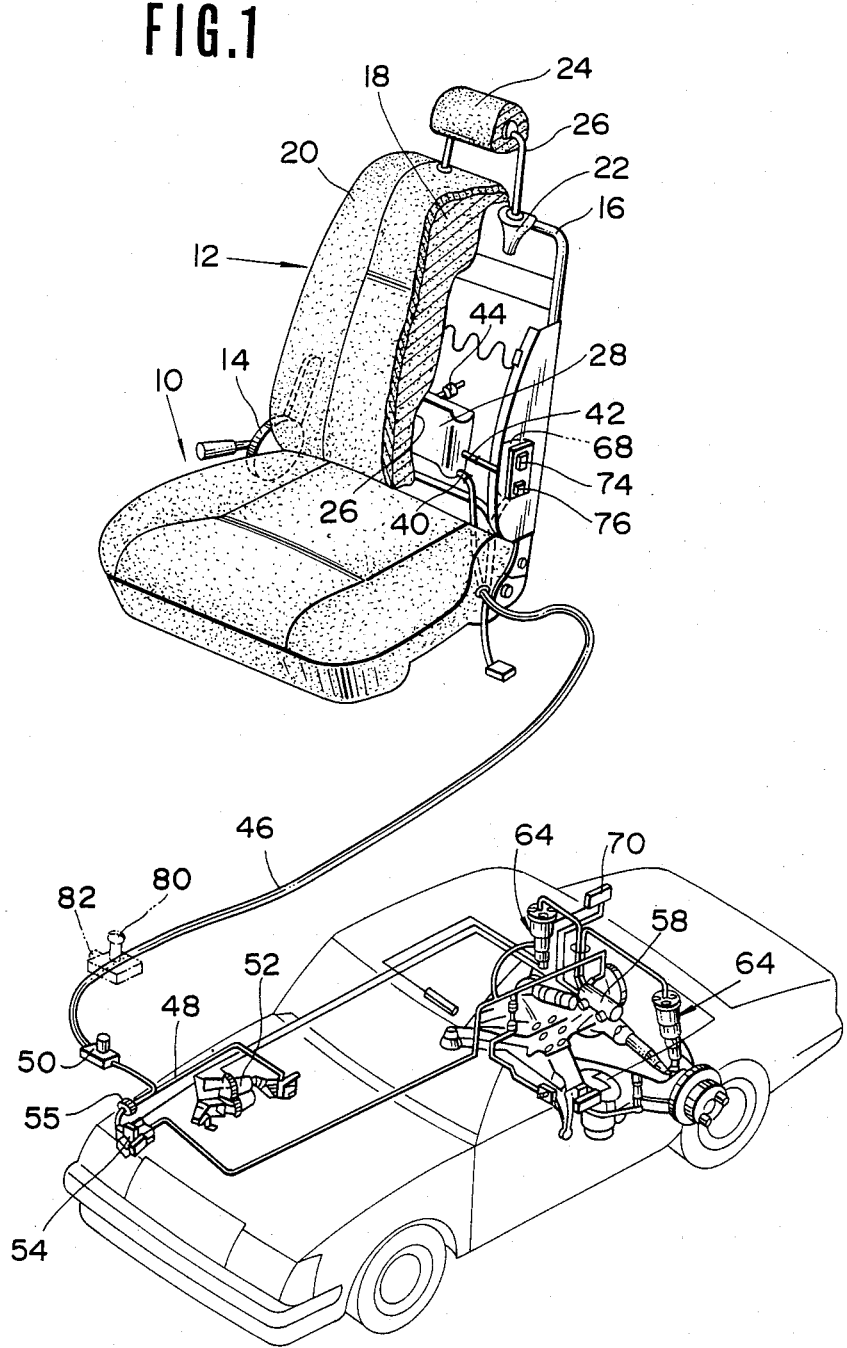
FIG. 1 is a schematic perspective view of a preferred embodiment of a pneumatic lumbar support according to the present invention.

Referring to drawings, especially FIG. 1, there is shown a seating position adjusting device for an automotive vehicle seat according to a preferred embodiment of the present invention. In the embodiment shown in the drawing, there is shown a pneumatic lumbar support for an automotive vehicle seat. However, the present invention can be applied not only to the pneumatic lumbar support discussed hereinbelow, but also to adjusting devices such as a thigh support, a side support, or the like.

As shown in FIG. 1, a seat for an automotive vehicle is composed of a seat cushion 10 and a seat back 12. The seat back 12 is tiltably mounted on the seat cushion 10 through a reclining mechanism 14. The seat back 12 is composed of a seat back frame 16, a seat back cushion 18, and a seat covering 20. In addition, the seat back frame 16 is formed with head-rest bosses 22. A head-rest frame 26 for supporting a head-rest 24 is engaged in head-rest bosses 22.

Figure 2:
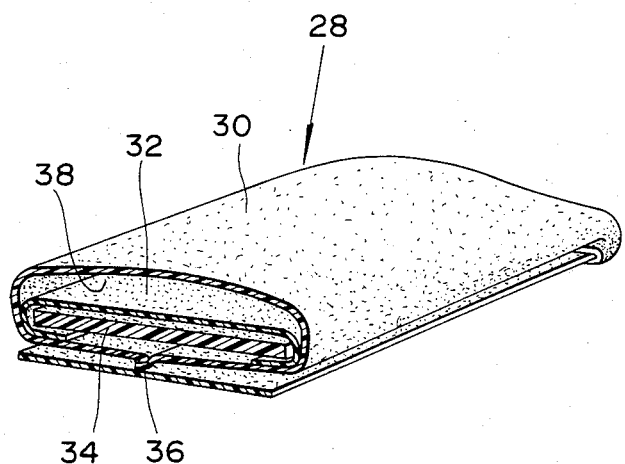
FIG. 2 is a cut-away perspective view of a pneumatic bag used for the pneumatic lumbar support in FIG. 1.

The seat back cushion 18 is formed with a narrow space 26 in which a hollow pneumatic bag 28 made of a flexible material such as a synthetic resin is housed. The pneumatic bag 28 is formed, for example as shown in FIG. 2, in such manner that two substantially rectangular sheets 30 and 32 are thermally bonded at their edges, and one of the sheets is securely attached to a rigid resin plate 34. The bonded edges 36 are wrapped around to the back surface of the rigid resin plate 34 and the two opposing edges 36 are thermally bonded so as to form a pneumatic chamber 38 between the two sheets 30 and 32 above the external surface of the resin plate 34.

The pneumatic bag 28 is disclosed in European Patent Application Publication No. 0 058 951, issued on Nov. 1, 1982. This European Patent Application Publication is referred to for the purpose of the description of the present invention.

As shown in FIGS. 1 and 2, the pneumatic bag 28 is provided with an intake port 40 for introducing the working gas into the pneumatic chamber 38 and an exhaust port 42 for exhausting the working gas from the pneumatic chamber 38, and additionally a relief valve 44 which vents the pressure from the chamber when the interior pressure of the pneumatic chamber is increased by the working gas introduced through the intake port 40 to the point of coincidence with a predetermined value so that the interior pressure of the pneumatic chamber is held at the predetermined value or less.

The relief valve 44 may be installed not ony in the pneumatic bag 28 directly but also in any suitable place such midway along the working gas conduit.

As shown in FIG. 1, the intake port 40 is connected to a working gas circulating conduit 48 for the pneumatic vehicle height adjusting system through a pressurized gas supply tube 46. The supply tube 46 is provided with a control valve 50 which is actuatable between open and closed positions so that the intake port 40 and the working gas circulating conduit 48 for the vehicle height adjusting system are connected or separated, respectively.

The vehicle height adjusting system is disclosed in, for example, U.S. Pat. No. 4,327,936 issued on May 4, 1982 to inventor Tomoyoshi Sekiguchi. An electrical circuit for driving the vehicle height adjusting system is additionally disclosed in U.S. Pat. No. 4,349,077 issued on Sept. 14, 1982 to inventors Tomoyoshi Sekiguchi et al. The descriptions of the above two U.S. patents are referred to as part of the description of the present specification.

A working gas supply circuit for the pneumatic lumbar support according to the preferred embodiment of the present invention will be explained with reference to a working gas supply circuit for the vehicle height adjusting device according to FIG. 3. A compressor 52 is connected to a reservoir tank 58 via a dehumidifier 54 for removing moisture from the working gas, and one-way check valves 55 and 56. The reservoir tank 58 is provided with a control valve 62 which controls the pressure in the reservoir tank in response to a signal from the vehicle height adjusting device, referred to later, and is connected to a pressure chamber 66 of a suspension assembly 64 through the control valve 62.

A composition of the suspension assembly 64 is disclosed in West German Patent Application Publication No. 31 38 079 issued on May 13, 1982. The description of this West German Patent Application Publication is referred to as part of the description of the present specification.

The compressor 52 is also connected to the intake port 40 of the pneumatic bag 28 through the control valve 50. On the other hand, the exhaust port 42 of the pneumatic bag 28 is vented to the ambient air through an exhaust valve 68 shown in FIG. 1.

The control valve 62 of the vehicle height adjusting system is controlled between its open and closed positions by a driving signal from a vehicle height control circuit 70. The control circuit 70 is provided with a vehicle height sensor 72. The sensor 72 detects the relative distance between the vehicle body and the axle of the vehicle, and outputs an "up"-signal when the detected value is smaller than a predetermined value or a "down"-signal when the detected value is greater than the predetermined value. The vehicle height control circuit 70 generates a control signal to control the control valve 62 in accordance with the output signal from the vehicle height sensor 72 so as to hold the relative distance between the vehicle body and the axle constant.

On the other hand, the control valve 50 of the pneumatic lumbar support is connected to a lumbar support control switch 74 installed in the side of the seat back as shown in FIG. 1 through a relay coil 57 of a relay 53 so that the control valve is actuated between its open and closed positions in synchronism with the turning of the switch ON or OFF. The lumbar support control switch 74 is also connected to the compressor 52 via a movable contact 59 of the relay 53, so that since the contact 59 will be closed when the relay coil 57 is excited after the switch is turned on, the compressor 52 will be driven. An operation button 76 for operating the exhaust valve 68 between its open and close positions is installed in the vicinity of the lumbar support control switch 74 in the side of the seat back.

Figure 3:
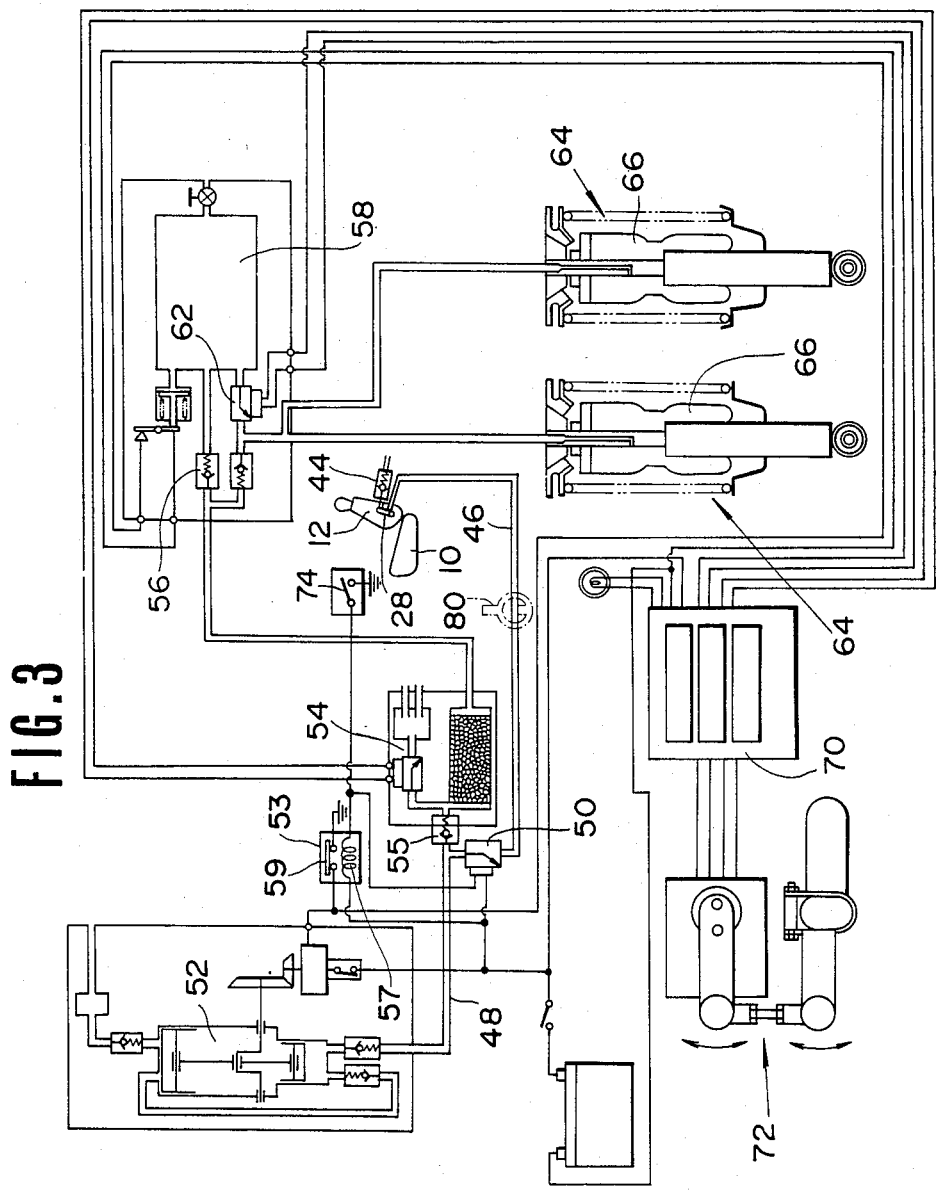
FIG. 3 is a circuit diagram of the pneumatic lumbar support in FIG. 1.

As shown in phantom lines in FIGS. 1 and 3, the pressurized gas supply tube 46 may be provided with a switching cock 80 and a connector 82 so that the pressurized gas can be supplied to a tire, a rubber raft, or the like.

Hereinbelow, the operation of the pneumatic lumbar support according to the above described embodiment will be explained.

First of all, in order to increase the tension of the lumbar support, the passenger pushes the lumbar support control switch 74, so that the compressor 52 is actuated. The control valve 50 is opened upon actuation of the compressor 52 so that the pressurized gas sent from the compressor is conducted into the pneumatic chamber 38 through the control valve 50 and the intake port 40. The pneumatic bag 28 expands as the pressure in the pneumatic chamber 38 increases, and thus the tension of the lumbar support is increased.

In this case, when the pressure in the pneumatic chamber 38 increases and exceeds a predetermined value, the relief valve 60 is vented to hold the pressure in the pneumatic chamber at the predetermined value. On the other hand, back-flow of the working gas from the reservoir tank 58 of the vehicle height adjusting system is prevented by the one-way check valve 55. Accordingly, even when the pneumatic lumbar support is being adjusted, the vehicle height adjusting function is free from the influence of the above operation.

Conversely, in order to decrease the pressure in the pneumatic chamber, the exhaust valve 68 is vented when the operation button 76 is pushed. The pneumatic bag contracts as the pressure in the pneumatic chamber is decreased. Thus, the lumbar support is relaxed.

As given explanation above, the adjusting device for automotive vehicle seat according to the present invention can be applied not only to the pneumatic lumbar support of the above explained embodiment but also to a thigh support, a side support, or the like. For example, it is possible to apply the present invention to a working gas feeding system for the device disclosed in U.S. Pat. No. 3,330,598.

We claim:

1. An adjusting device for an automotive vehicle seat comprising:
    means defining a pneumatic chamber in a seat for an automotive vehicle;
    a vehicle height adjusting means which detects the relative displacement between the vehicle body and the axle of a wheel of the vehicle and regulates the pressure of the working gas supplied by a pressure supply source included therein so as to maintain the displacement within a predetermined range;

a pressure increasing means for increasing the pressure in the pneumatic chamber, said pressure increasing means being so arranged between the pneumatic chamber and the pressure supply source of said vehicle height adjusting means as to introduce the working gas fed from the pressure supply source into the pneumatic chamber to increase the volume of the pneumatic chamber;

a pressure decreasing means for decreasing the pressure in the pneumatic chamber, said pressure decreasing means being adapted to vent the pneumatic chamber to the ambient air so as to exhaust the working gas from pneumatic chamber to the ambient air to decrease the volume of the pneumatic chamber; and operation means for adjusting the seating position of the seat by selectively actuating said pressure increasing means or pressure decreasing means.

2. The device according to claim 1, wherein said pressure supply source is a compressor for driving said vehicle height adjusting means.

3. The device according to claim 2, wherein said pressure increasing means contains a non-return valve means for preventing back-flow of the working gas from said vehicle height adjusting means.

4. The device according to claim 2, wherein said pressure increasing means comprises a pressurized gas supply passage connected to a working gas circulating conduit of said vehicle height adjusting means, and a control valve installed along said pressurized gas supply passage, whereby said control valve opens in response to said operation means being switched to the pressure increasing state so that said pressure supply source and said pneumatic chamber communicate.

5. The device according to claim 4, wherein said pneumatic chamber is a bag formed of a flexible material.

6. A pneumatic lumbar support for automotive vehicle seat comprising;

a bag made of a flexible material housed in the automotive vehicle seat;

a vehicle height adjusting system which detects a relative displacement between the vehicle body and the axle of the vehicle and regulates the pressure of a working gas supplied to a suspension of the vehicle when the displacement exceeds a predetermined value so as to maintain the relative distance between the vehicle body and the axle;

a working gas supply source for delivering the working gas under pressure, said supply source being a component of said vehicle height adjusting system;

a working gas circulating passage for communicating between said working gas supply source and said suspension;

a working gas supply passage for connecting said flexible bag and said working gas circulating passage;

an intake control valve installed along said working gas supply passage so as to block or unblock said working gas supply passage;

an exhaust control valve installed along an exhaust passage connecting said flexible bag to the ambient air; and controllers for adjusting the pressure of the working gas in said flexible bag by selectively actuating said intake control valve or said exhaust control valve, whereby the tension of said lumbar support can be adjusted by expanding or contracting said flexible bag.

7. The pneumatic lumbar support according to claim 6, wherein said working gas circulating passage is provided with a non-return valve for preventing back-flow of the working gas from said suspension to said working gas supply passage.

8. The pneumatic lumbar support according to claim 7, wherein said flexible bag is further provided with a relief valve which is vented whenever the pressure of the working gas exceeds a predetermined pressure so as to restrict the pressure of the working gas in said bag to an upper limit.

9. The pneumatic lumbar support according to claim 8, wherein said intake control valve is an electromagnetic valve and said controller for controlling the actuation of said intake control valve is an ON-OFF switch electrically connected to said intake control valve.

10. The pneumatic lumbar support according to claim 9, wherein said working gas supply passage is provided with a switching cock and a connector, through which the pressurized gas may be applied to other purposes.

* * * * *